US008429664B2

(12) United States Patent
Ajima et al.

(10) Patent No.: US 8,429,664 B2
(45) Date of Patent: Apr. 23, 2013

(54) JOB SCHEDULING APPARATUS AND JOB SCHEDULING METHOD

(75) Inventors: Yuichiro Ajima, Kawasaki (JP); Kouichi Kumon, Kawasaki (JP); Shinji Sumimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 328 days.

(21) Appl. No.: 12/662,940

(22) Filed: May 12, 2010

(65) Prior Publication Data

US 2010/0293551 A1 Nov. 18, 2010

(30) Foreign Application Priority Data

May 13, 2009 (JP) ................................ 2009-116926

(51) Int. Cl.
*G06F 9/46* (2006.01)

(52) U.S. Cl.
USPC ........................................ 718/104; 705/7.12

(58) Field of Classification Search .................. 718/104; 705/7.12

See application file for complete search history.

(56) References Cited

U.S. PATENT DOCUMENTS

| 7,331,048 B2 | 2/2008 | Skovira |
| 2005/0235286 A1 | 10/2005 | Ballew et al. |

FOREIGN PATENT DOCUMENTS

| EP | 1318453 A1 | 6/2003 |
| EP | 1582981 A1 | 10/2005 |
| JP | 2005-310139 | 11/2005 |
| JP | 2006-521640 | 9/2006 |
| WO | 2004/088547 A2 | 10/2004 |
| WO | 2006/087713 A2 | 8/2006 |

OTHER PUBLICATIONS

Yoo, Seong-Moo and Youn, Hee Yong. An Efficient Task Allocation Scheme for 2D Mesh Architectures. IEEE Transactions on Parallel and Distributed Systems, vol. 8, No. 9, Sep. 1997.*
Sharma, Debendra Das and Pradhan, Dhiraj K. A Fast and Efficient Strategy for Submesh Allocation in Mesh-Connected Parallel Computers. Department of Computer Science, Texas A&M University. IEEE 1993.*
Liu, T.; Huang, W-K.; Lombardi, F.; Bhuyan, L.N.; A Submesh Allocation Scheme for Mesh-Connected Multiprocessor Systems. Department of Computer Science, Texas A&M University. 1995 International Conference on Parallel Processing.*
Sharma, Debendra Das and Pradhan, Dhiraj K. Job Scheudling in Mesh Multicomputers. IEEE Transactions on Parallel and Distributed Systems, vol. 9, No. 1, Jan. 1998.*
Kim, Geunmo; Yoon, Hyunsoo. On Submesh Allocation for Mesh Multicomputers: A Best-Fit Allocation and a Virtual Submesh Allocation for Faulty Meshes. IEEE Transactions on Parallel and Distributed Systems, vol. 9, No. 2, Feb. 1998.*
Chung-yen Chang et al., "Performance Improvement of Allocation Schemes for Mesh-Connected Computers", Journal of Parallel and Distributed Computing 52, 1998, pp. 40-68.
European Search Report dated Dec. 23, 2011 issued in corresponding European Patent Application No. 10162645.5.

(Continued)

*Primary Examiner* — Johnna Loftis
(74) *Attorney, Agent, or Firm* — Staas & Halsey LLP

(57) ABSTRACT

When allocating an unallocated queued job, by using a CDA having a mesh structure to which active jobs are allocated, a job scheduling apparatus scans an event list that includes information about allocation events and release events for jobs, determines the coordinates and the time at which submeshes corresponding to the queued jobs are reserved, and arranges the submeshes by overlapping them on the CDA.

6 Claims, 12 Drawing Sheets

OTHER PUBLICATIONS

Yahui Zhu, "Efficient Processor Allocation Strategies for Mesh-Connected Parallel Computers", Journal of Parallel and Distributed Computing vol. 16, issue 4, pp. 328-337 (1992).

David Lifka, "The ANL/IBM SP Scheduling System", In Proceedings of the Workshop on Job Scheduling Strategies for parallel Processing D.G. Feitelson and L. Rudolph, Eds. Lecture Notes in Computer Science, vol. 949. Springer-Verlag, London, 8 pages (1995).

Ahuva W. Mu'alem et al., "Utilization, Predictability, Workloads, and User Runtime Estimates in Scheduling the IBM SP2 with Backfilling", IEEE Trans. Parallel Distrib. Syst. 12, 6, pp. 529-543 (2001).

Korean Office Action issued Jun. 22, 2011 in corresponding Korean Patent Application 10-2010-0042280.

* cited by examiner

| START TIME | COORDINATES | SIZE | EXECUTION TIME | USER NAME |
|---|---|---|---|---|
| 09:31:26, JANUARY 11 | (0, 3) | (3, 3) | 24 HOURS | A |
| 13:30:43, JANUARY 11 | (3, 0) | (5, 5) | 8 HOURS | B |
| 13:47:50, JANUARY 11 | (0, 6) | (6, 2) | 4 HOURS | C |
| ⋮ | ⋮ | ⋮ | ⋮ | ⋮ |

FIG.5

| JOB SUBMISSION TIME | PRIORITY | SIZE | EXECUTION TIME | USER NAME |
|---|---|---|---|---|
| 14:10:03, JANUARY 11 | 100 | (8, 3) | 8 HOURS | D |
| 13:36:11, JANUARY 11 | 0 | (5, 3) | 24 HOURS | E |
| ⋮ | ⋮ | ⋮ | ⋮ | ⋮ |

FIG.6

| ADDRESS | NEXT ADDRESS | TIME | TYPE | COORDI-NATES | SIZE |
|---|---|---|---|---|---|
| 81B40020h | 81B40050h | 17:47:50, JANUARY 11 | RELEASE | (0, 6) | (6, 2) |
| 81B40050h | 81B40010h | 17:47:50, JANUARY 11 | ALLOCATION | (3, 5) | (5, 3) |
| 81B40010h | 81B40030h | 21:30:43, JANUARY 11 | RELEASE | (3, 0) | (5, 5) |
| 81B40030h | 81B40040h | 21:30:43, JANUARY 11 | ALLOCATION | (0, 0) | (8, 3) |
| 81B40040h | 81B40000h | 05:30:43, JANUARY 12 | RELEASE | (0, 0) | (8, 3) |
| 81B40000h | 81B40060h | 09:31:26, JANUARY 12 | RELEASE | (0, 3) | (3, 3) |
| 81B40060h | 00000000h | 17:47:50, JANUARY 12 | RELEASE | (3, 5) | (5, 3) |

OVERLAPPED SUBMESHES

COVERAGE DEPTH ARRAY

FIG.14

| ADDRESS | NEXT ADDRESS | TIME | TYPE | COORDI-NATES | SIZE | |
|---|---|---|---|---|---|---|
| 81B40020h | 81B40010h | 17:47:50, JANUARY 11 | RELEASE | (0, 6) | (6, 2) | (3) |
| 81B40010h | 81B40000h | 21:30:43, JANUARY 11 | RELEASE | (3, 0) | (5, 5) | (2) |
| 81B40000h | 00000000h | 09:31:26, JANUARY 12 | RELEASE | (0, 3) | (3, 3) | (1) |

FIG.15

| ADDRESS | NEXT ADDRESS | TIME | TYPE | COORDI-NATES | SIZE | |
|---|---|---|---|---|---|---|
| 81B40020h | 81B40010h | 17:47:50, JANUARY 11 | RELEASE | (0, 6) | (6, 2) | (3) |
| 81B40010h | 81B40030h | 21:30:43, JANUARY 11 | RELEASE | (3, 0) | (5, 5) | (2) |
| 81B40030h | 81B40040h | 21:30:43, JANUARY 11 | ALLOCATION | (0, 0) | (8, 3) | (4) |
| 81B40040h | 81B40000h | 05:30:43, JANUARY 12 | RELEASE | (0, 0) | (8, 3) | (4) |
| 81B40000h | 00000000h | 09:31:26, JANUARY 12 | RELEASE | (0, 3) | (3, 3) | (1) |

FIG.16
| ADDRESS | NEXT ADDRESS | TIME | TYPE | COORDI-NATES | SIZE | |
|---|---|---|---|---|---|---|
| 81B40020h | 81B40050h | 17:47:50, JANUARY 11 | RELEASE | (0, 6) | (6, 2) | (3) |
| 81B40050h | 81B40010h | 17:47:50, JANUARY 11 | ALLOCATION | (3, 5) | (5, 3) | (5) |
| 81B40010h | 81B40030h | 21:30:43, JANUARY 11 | RELEASE | (3, 0) | (5, 5) | (2) |
| 81B40030h | 81B40040h | 21:30:43, JANUARY 11 | ALLOCATION | (0, 0) | (8, 3) | (4) |
| 81B40040h | 81B40000h | 05:30:43, JANUARY 12 | RELEASE | (0, 0) | (8, 3) | (4) |
| 81B40000h | 81B40060h | 09:31:26, JANUARY 12 | RELEASE | (0, 3) | (3, 3) | (1) |
| 81B40060h | 00000000h | 17:47:50, JANUARY 12 | RELEASE | (3, 5) | (5, 3) | (5) |
FIG.17
COVERAGES 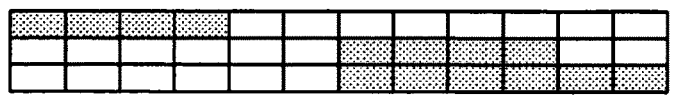
COVERAGE DEPTH ARRAY 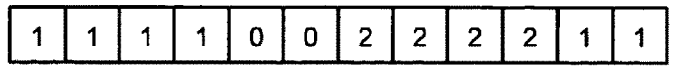
DELTA ENCODED CDA 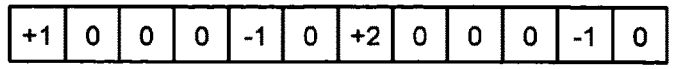
SCAN ORDER →

JOB SCHEDULING APPARATUS AND JOB SCHEDULING METHOD

CROSS-REFERENCE TO RELATED APPLICATION(S)

This application is based upon and claims the benefit of priority of the prior Japanese Patent Application No. 2009-116926, filed on May 13, 2009, the entire contents of which are incorporated herein by reference.

FIELD

The embodiments discussed herein are directed to a job scheduling program, a job scheduling apparatus, and a job scheduling method.

BACKGROUND

In recent years, supercomputers serving as information processing apparatuses that perform scientific and technical computation have, for example, as may as tens of thousands of computing nodes. Each computing node is connected to a mesh network. An example of a type of mesh network is a mesh network formed as an assembly of a plurality of building blocks, which constitutes the whole mesh network. Therefore, the mesh network has a characteristic in which it can be extended in building block units, i.e., the mesh network has a characteristic of high extensibility.

With supercomputers, to prevent communication interference between jobs, a system is divided into rectangular or cuboid partial regions that constitute part of the mesh network (hereinafter, "submesh"), and the divided systems execute the jobs that are allocated to them. However, job allocation to submeshes causes fragmentation in the systems, whereby there are submeshes to which jobs cannot be allocated. This may causes a reduction in activity the ratio in the system.

In the field of scientific and technical computation (also called a High Performance Computing (HPC) field) in which supercomputers operate, the effect of fragmentation on submeshes is particularly serious because the supercomputers are continuously operating while executing various jobs. Accordingly, to alleviate the fragmentation, there is a technology for backfilling performed in job scheduling.

In job scheduling, jobs are controlled and executed. And, there is a method in which small scale jobs or jobs given low priority from the beginning, which are waiting for a long time because a large scale job came in first or a job given high priority from the beginning is executed, are executed before executing large scale jobs by raising the priority of such low priority jobs. Here, the term "large scale" means that the "processing time is relatively long", whereas the term "small scale" means that the "processing time is relatively short". This scheduling method is called backfill (Backfilling).

For the backfilling, two algorithms, i.e., conservative and aggressive, are proposed. For example, aggressive backfilling ensures an execution start time only for the highest priority queued job; whereas conservative backfilling ensures an execution start time for all queued jobs. Because of this, the conservative backfilling can avoid a starvation phenomenon, in which a specific job is never executed, and can submit an execution start time for queued jobs to users, which are advantages. However, when compared with the aggressive backfilling, the conservative backfilling needs a large amount of computational effort, and thus disadvantageously affects scheduling performance.

Furthermore, with the aggressive backfilling, because no operation is performed on queued jobs that cannot be started, the amount of computational effort to perform the aggressive backfilling is proportional to the number of queued jobs. In contrast, the conservative backfilling reserves computational resources (hardware resources) for future use. The reservation of computational resources performed by the conservative backfilling has two events, i.e., resource acquisition and resource release. The events are listed in order of occurrence and managed by a list called an event list.

With an algorithm for the conservative backfilling, scheduling is performed by scanning an event list and searching for a period of time during which a computational resource (hardware resource) that is needed by a job can be ensured for the necessary period of time. Accordingly, the amount of computational effort to perform the conservative backfilling is proportional to the square of the number of queued jobs. With the aggressive and the conservative backfilling, it is determined, in order of high priority, whether queued jobs are available for execution.

A large amount of computational effort is needed for submesh allocation, and furthermore, further a large amount of computational effort is needed when submesh allocation and backfilling are both performed at the same time. Accordingly, with the conventional technology, it is difficult to develop conservative backfilling for practical use that takes into consideration a mesh topology; therefore, aggressive backfilling or a simpler method is used. An example of the simpler method is a technology in which small jobs executed in a short time are moved ahead first for execution without taking into consideration priority and without making a reservation for submeshes.

[Patent Document 1] Japanese Laid-open Patent Publication No. 2005-310139

[Non-patent Document 1] Y. Zhu, "Efficient Processor Allocation Strategies for Mesh-Connected Parallel Computers", Journal of Parallel and Distributed Computing, vol. 16, issue 4, pp. 328-337, December 1992.

[Non-patent Document 2] Lifka, D. A. "The ANL/IBM SP Scheduling System" In Proceedings of the Workshop on Job Scheduling Strategies For Parallel Processing D. G. Feitelson and L. Rudolph, Eds. Lecture Notes In *Computer Science*, vol. 949. Springer-Verlag, London, pp. 295-303, 1995.

[Non-patent Document 3] Mu'alem, A. W. and Feitelson, D. G. 2001. "Utilization, Predictability, Workloads, and User Runtime Estimates in Scheduling the IBM SP2 with Backfilling" IEEE Trans. Parallel Distrib. Syst. Vol. 12, No. 6, pp. 529-543, June 2001.

However, with the technology described above, there is a problem in that the activity ratio of the system that executes jobs is reduced. Specifically, with the technology in which small jobs are moved ahead first without taking into consideration the priority, because starvation may occur for large jobs that take a long time for execution, a policy control needs to be used in which delayed jobs are given increased priority. At this time, because prioritization is performed on the delayed jobs, it is impossible to avoid a delay in starting the execution of large jobs. Furthermore, moving ahead large jobs, which are given higher priority, using backfilling is eventually impossible. As a result, with the technology described above, the activity ratio of the system that executes jobs is reduced.

SUMMARY

According to an aspect of an embodiment of the invention, a job scheduling apparatus for allocating jobs to a plurality of information processing apparatuses includes a storing unit that stores therein a two-dimensional array that stores therein the jobs to be allocated to the plurality of information processing apparatuses in such a manner that the jobs to be allocated are digitized and converted into array elements that correspond to the plurality of information processing apparatuses; a depth value calculating unit that calculates, using the two-dimensional array stored in the storing unit, depth values representing a degree of interference between jobs, the depth values being calculated on a basis of numerical values stored in array elements to which jobs are allocated in the two-dimensional array; a searching unit that searches the two-dimensional array for array elements that can be used for allocation corresponding to the jobs to be allocated on a basis of the depth values calculated by the depth value calculating unit; and an arranging unit that arranges, if there are array elements that can be used for allocation obtained by the searching unit, the job to be allocated by digitizing and converting into the array elements that can be used for the allocation.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 5 is a table illustrating an example of a queued job list;

FIG. 6 is a table illustrating an example of an event list;

FIG. 14 is a table illustrating an example of an event list processed in accordance with the queued job allocation process;

FIG. 15 is a table illustrating an example of an event list processed in accordance with a queued job allocation process;

FIG. 16 is a table illustrating an example of an event list processed in accordance with the queued job allocation process;

FIG. 17 is a diagram illustrating an example of a CDA that stores therein difference values.

DESCRIPTION OF EMBODIMENTS

Preferred embodiments of the present invention will be explained with reference to accompanying drawings.

The present invention is not limited to the embodiment described below.

[a] First Embodiment

Figure 1:
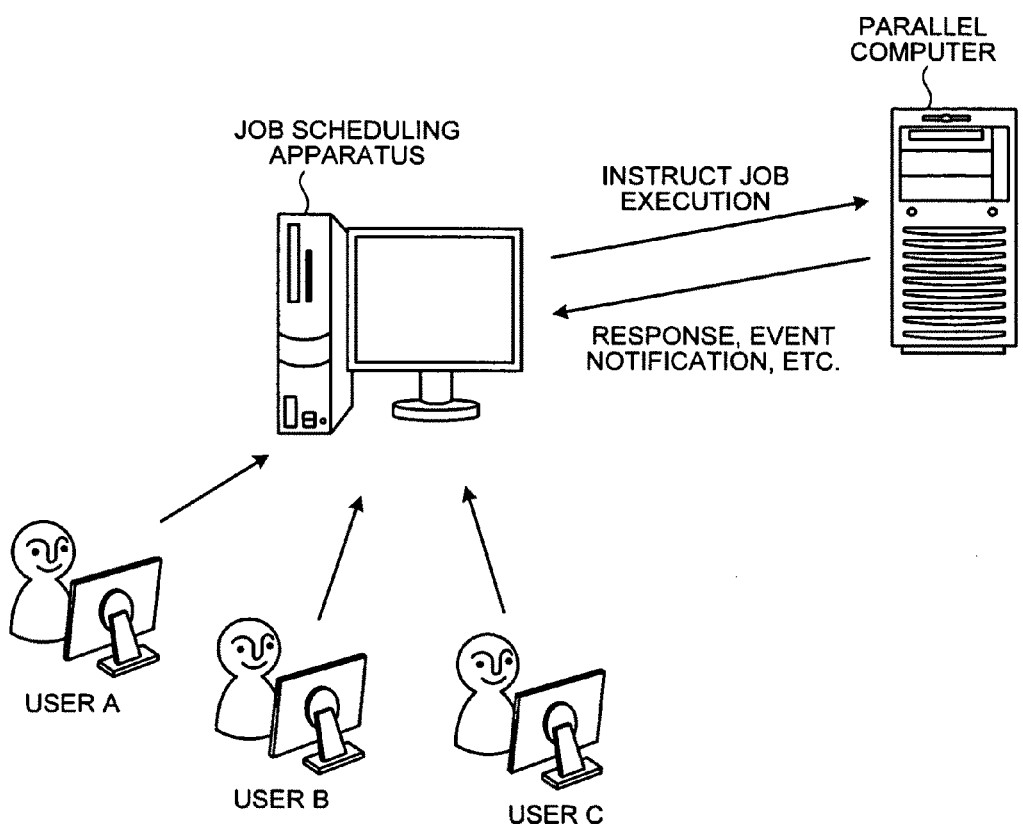
FIG. 1 is a schematic diagram illustrating an example configuration of a system including a job scheduling apparatus.

First, the system configuration including a job scheduling apparatus disclosed in the present invention will be described with reference to FIG. 1. FIG. 1 is a schematic diagram illustrating an example configuration of a system including the job scheduling apparatus.

As illustrated in FIG. 1, the job scheduling apparatus according to the present invention is connected to, for example, a parallel computer, and instructs the parallel computer to execute jobs. The parallel computer has a plurality of computing nodes and executes the target jobs in each computing node in accordance with job execution instructions received from the job scheduling apparatus. The parallel computer used here can be, for example, a tightly-coupled system such as a system that has a plurality of information processing apparatuses, an information processing apparatuses that has a plurality of control units (system boards or server blades), or the like, or can be a loosely-coupled system in which a plurality of information processing apparatuses are connected to a network.

Furthermore, the job scheduling apparatus receives job submissions from terminal devices such as personal computers (PCs) belonged to a plurality of users. In FIG. 1, as an example of a plurality of users, a user A, a user B, and a user C are illustrated. Each of the users inputs jobs to be executed by the parallel computer using an input device such as a keyboard or a mouse included in the PC.

Then, in accordance with the job execution instruction from the job scheduling apparatus, after executing the jobs in each computing node, the parallel computer sends, to the job scheduling apparatus, messages such as response messages with respect to the job execution instructions or event notification messages containing job completion or abnormal condition notifications.

With the above described configuration, the job scheduling apparatus reserves submeshes that serve as computational resources (hardware resources) for the queued jobs. Specifically, the job scheduling apparatus, first, creates an empty event list, adds a submesh release event for an active job, and then reserves, from among the queued jobs, submeshes in order of priority.

Then, the job scheduling apparatus scans the event list for the reservations for the submeshes. If the coordinates and times that are used to reserve submeshes are determined, the job scheduling apparatus adds a submesh acquisition event and a submesh release event to the event list. The submesh acquisition event includes, for example, designation of a position and a time that are used to allocate queued jobs. The submesh release event includes, for example, designation of a time that is used to release an active job. The job scheduling apparatus reserves submeshes for all of the queued jobs by repeatedly executing the above processes.

Figure 2:
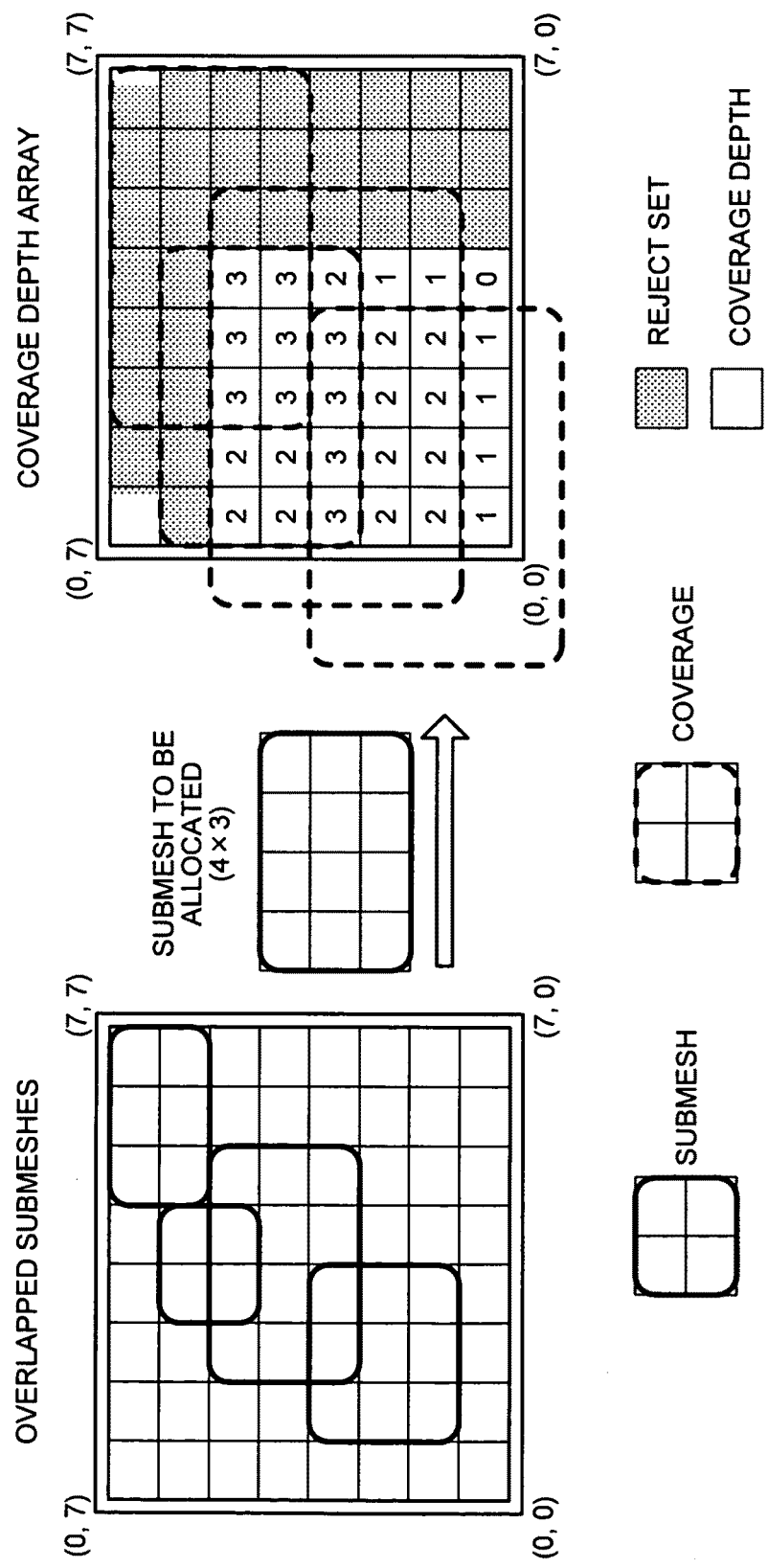
FIG. 2 is a schematic diagram explaining queued job allocation.

In the following, queued job allocation will be described with reference to FIG. 2. FIG. 2 is a schematic diagram explaining queued job allocation.

A front anchor pointer "FP", a rear anchor pointer "RP" and a coverage depth array "CDA" are used for the queued job allocation.

The FP and the RP are pointers for scanning an event list. As illustrated in FIG. 2, the CDA keeps coverages that are used to determine availability of submesh allocation by overlapping coverages. The event list is in chronological order. Scanning is performed in such a manner that the RP is given priority over the FP, i.e., an event time of the FP is given priority over an event time of the RP.

In each element in the CDA, the number of jobs that interferes with jobs registered in the event list, if a queued job is executed in a computing node corresponding to an element as the origin, is stored. When the job scheduling apparatus processes a submesh acquisition event using the FP, the job scheduling apparatus overlaps the corresponding coverage on the CDA. When the job scheduling apparatus processes a submesh acquisition event using the RP, it removes the corresponding coverage from the CDA. In short, with the CDA, by checking the number of jobs stored in predetermined coordinates, if a queued job is allocated to these predetermined coordinates, it is possible to detect whether the queued job interferes with the allocated job that is present between the FP and the RP.

In FIG. 2, the CDA has a structure of 8×8 submeshes, and four jobs are allocated to the submeshes. Furthermore, FIG. 2 illustrates a case in which a 4×3 job is allocated to the CDA. In the left portion of FIG. 2, a case in which submeshes to which four jobs are allocated is illustrated; submeshes are overlapped because coverages that are used to determine availability of submesh allocation are overlapped with each other.

When the job scheduling apparatus allocates the 4×3 job, as in the diagram in the right portion of FIG. 2, on the basis of the size limit of the 8×8 mesh, computing nodes in which the 4×3 submesh cannot be allocated to the origin of each computing node are set to "reject set". Subsequently, the job scheduling apparatus creates coverages corresponding to the submeshes illustrated in the left portion of FIG. 2. The coverages corresponding to the submeshes illustrated in the left portion of FIG. 2 are rectangular, as indicated by the dashed line in FIG. 2.

The coverages indicate an interference region caused by the already allocated submeshes being overlapped with the 4×3 submesh if the 4×3 submesh is allocated. Specifically, in the vertical axis and the horizontal axis of the 8×8 mesh, each rectangular coverage is obtained by extending the already allocated submesh into (3, 2) in the direction of the origin, which corresponds to the region obtained by subtracting one row and one column from the 4×3 submesh to be allocated.

As a result of the queued job being allocated in this way, a computing node having a value "0" appears on the CDA. This computing node becomes the origin to which a submesh can be allocated. In FIG. 2, the coordinates (4, 0) of a computing node are for the computing node having a value "0". In short, on the CDA, the job scheduling apparatus allocates a queued job to a computing node that is located somewhere other than the reject set region and has a value "0". This computing node with the value "0" serves as the origin to which a submesh is allocated. The job scheduling apparatus performs the queued job allocation by performing the above described process by the same number of times as there are queued jobs.

When the job scheduling apparatus arranges an unallocated queued job on the CDA in which an active job has been arranged, the job scheduling apparatus arranges an allocatable submesh in such a manner that the position and the time of the allocatable submesh are overlapped. Accordingly, the activity ratio of the system executing jobs can be improved.

Configuration of the Job Scheduling Apparatus

Figures 3, 4:
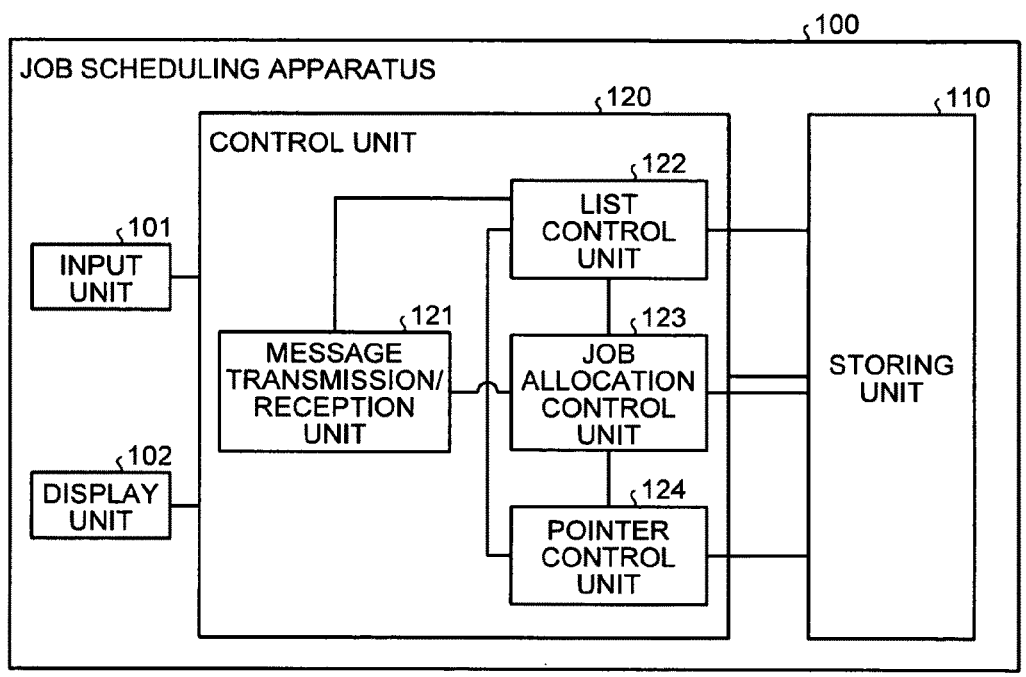
FIG. 3 is a block diagram illustrating an example configuration of a job scheduling apparatus according to a first embodiment.
FIG. 4 is a table illustrating an example of an active-job list.

Next, the configuration of the job scheduling apparatus according to the first embodiment will be described with reference to FIG. 3. FIG. 3 is a block diagram illustrating an example configuration of the job scheduling apparatus according to the first embodiment.

As illustrated in FIG. 3, a job scheduling apparatus 100 includes an input unit 101, a display unit 102, a storing unit 110, and a control unit 120. The job scheduling apparatus 100 instructs the parallel computer, to which it is connected, to execute jobs. The parallel computer executes these various jobs. Furthermore, the job scheduling apparatus is connected to, for example, a plurality of PCs and receives job submissions from these PCs.

The input unit 101 has, for example, a keyboard or a mouse and receives various kinds of information contained in the job scheduling apparatus 100. The display unit 102 has, for example, a monitor (or a display, a touch panel, etc.) serving as a displaying unit or a speaker and displays and outputs various kinds of information contained in the job scheduling apparatus 100.

The storing unit 110 stores therein data needed for various processes performed by the control unit 120 or the results of various processes performed by the control unit 120. For example, the storing unit 110 stores therein an active-job list, a queued job list, an event list, and the CDA (see FIG. 2).

The active-job list stored in the storing unit 110 has, for example, information on jobs executed by the parallel computer as illustrated in FIG. 4. This information includes start times, coordinates, sizes, execution times, user names, and the like.

The start time indicates information on the start time of a job executed by the parallel computer. The coordinates and the size indicate information on the origin of the job and the size of that job in the CDA. The execution time indicates information on the time taken for executing the job. The user name indicates information on the user name of the PC connected to the job scheduling apparatus. FIG. 4 is a table illustrating an example of an active-job list.

As illustrated in FIG. 5, a queued job list has, for example, information on job submission from a PC connected to the job scheduling apparatus 100. This information includes job submission times, priorities, sizes, execution times, user names, and the like.

The job submission time indicates information on the job submission time received from a PC connected to the job scheduling apparatus 100. The priority indicates information on the degree of priority for jobs to be executed; the degree of priority is higher as the value becomes larger. The size indicates information representing the magnitude of jobs in the CDA. The execution time indicates information on the time used for executing jobs. The user name indicates information on the user name of the PC connected to the job scheduling apparatus 100. FIG. 5 is a table illustrating an example of a queued job list.

As illustrated in FIG. 6, the event list has information including, for example, addresses of active jobs and queued jobs, next addresses, times, types, the coordinates, sizes, and the like. The event list is in chronological order.

The address contains information that is used to identify an event, and the next address contains identification information on an event that is executed after the prior event. The time indicates information on the time at which an event is executed. The type is information on the type of event, e.g., "release" and "allocation". The coordinates and the size are information representing the origin of a job and the size of that job in the CDA.

In short, the event list includes information on an event whose type is "release" if the job is an active job, and information on an event whose type is "allocation" or "release" if the job is a queued job. For example, information whose coordinates and size are the same in the event list represents both an allocation event and a release event for a single job. FIG. 6 is a table illustrating an example of an event list.

The control unit 120 has a control program and an internal memory for storing necessary data and programs prescribing various kinds of procedures. The control unit 120 includes, in particular, as closely related to the present invention, a message transmission/reception unit 121, a list control unit 122, a job allocation control unit 123, and a pointer control unit 124. More specifically, it is possible for the control unit 120 to implement the above controls by allowing a CPU (Central Processing Unit) serving as a computing processing unit to function as the message transmission/reception unit 121, the list control unit 122, the job allocation control unit 123, and the pointer control unit 124.

The message transmission/reception unit 121 transmits and receives various kinds of information exchanged with the parallel computer connected to the job scheduling apparatus 100. For example, the message transmission/reception unit 121 transmits, to the parallel computer, a message instructing the parallel computer to execute commence executing a job when the job that is allocated by the job allocation control unit 123, which is described later, is executed. Furthermore, the message transmission/reception unit 121 receives a message indicating completion of the execution of the job and notifies the list control unit 122 of the completion with a message from the parallel computer connected to the job scheduling apparatus 100. And the list control unit 122 will be descried later.

The list control unit 122 performs a control of various lists stored in the storing unit 110. For example, the list control unit 122 receives a job submission from a PC connected to the job scheduling apparatus 100, adds the received job to the queued job list, and notifies the job allocation control unit 123 and the pointer control unit 124 that the job is added to the queued job list.

Furthermore, the list control unit 122 deletes the target job from the active-job list in accordance with the message, indicating the completion of the execution of the job, that is received from the parallel computer received from the message transmission/reception unit 121 and notifies the job allocation control unit 123 and the pointer control unit 124 that the job is deleted from the active-job list. Furthermore, the list control unit 122 creates and updates the event list in accordance with a notification received from the job allocation control unit 123 or the pointer control unit 124.

By updating the CDA, the job allocation control unit 123 allocates a queued job on the queued job list. For example, if the job allocation control unit 123 receives a notification indicating that a queued job is added by the list control unit 122, the job allocation control unit 123 allocates the added and queued job by arranging it on the CDA. Then, the job allocation control unit 123 sends, to the list control unit 122, an update request for the event list in accordance with the arrangement of the queued job on the CDA while cooperating with the pointer control unit 124. The job allocation control unit 123 also instructs the message transmission/reception unit 121 to send, to the parallel computer, an instruction to execute the allocated job when the allocated job is executed.

The pointer control unit 124 controls a pointer that is used to scan the event list. For example, the pointer control unit 124 controls the scanning of the event list using a front anchor pointer FP that scans a submesh acquisition event and a rear anchor pointer RP that scans a submesh release event.

Process of Allocating a Queued Job

Figure 7:
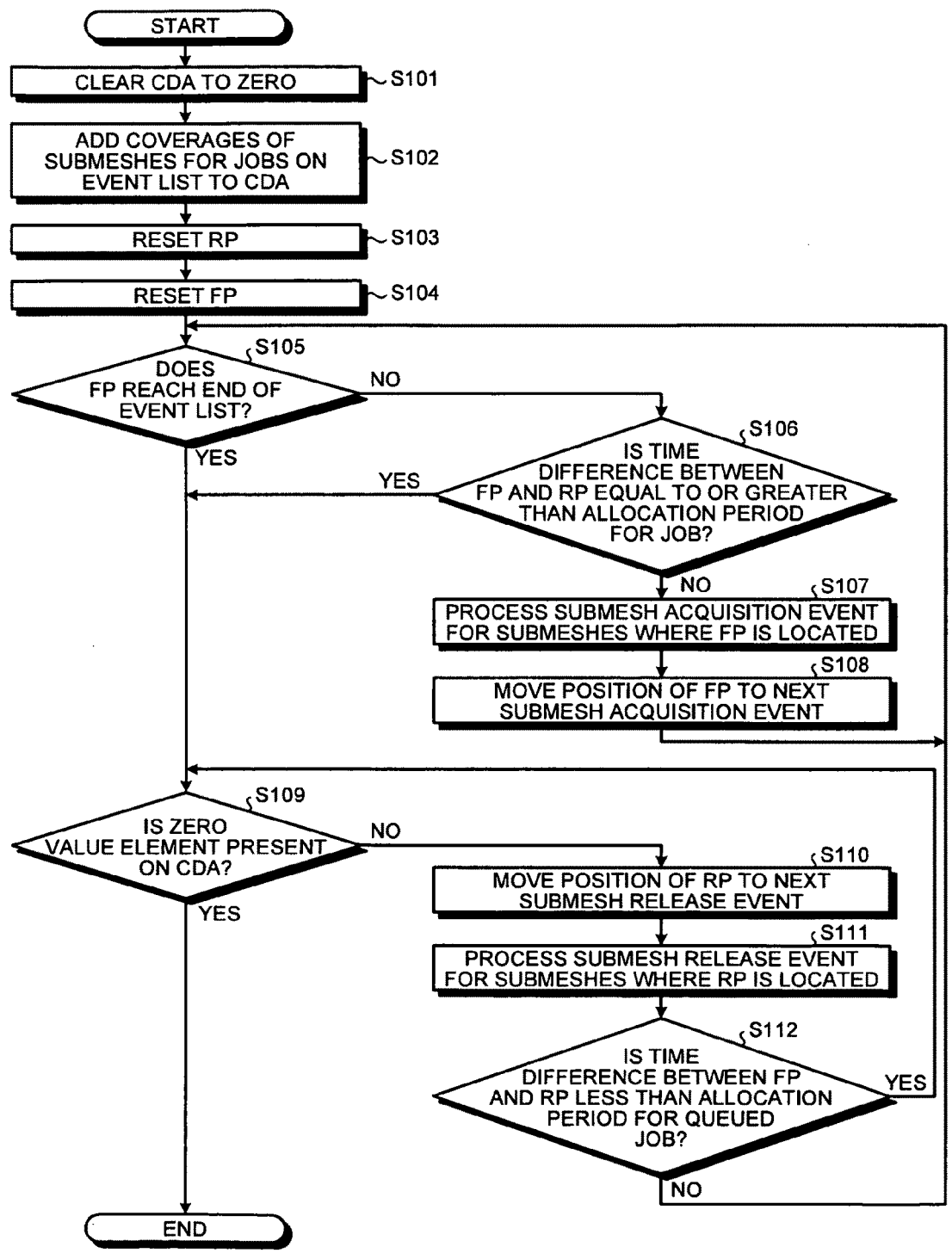
FIG. 7 is a flowchart illustrating the flow of a queued job allocation process according to the first embodiment.

Next, the flow of a process for allocating a queued job according to the first embodiment will be described with reference to FIG. 7. FIG. 7 is a flowchart explaining the flow of the process for allocating a queued job according to the first embodiment. In the following description, an event list containing information about the release of active jobs is assumed to be created in advance, and the event list is assumed to be in chronological order. Furthermore, the following processes are processes that is performed the same number of times as there are queued jobs when a message indicating the completion of the job performed by the parallel computer connected to the job scheduling apparatus 100 is received or when the queued job is registered due to job submission from the PC connected to the job scheduling apparatus 100.

For example, as illustrated in FIG. 7, the job scheduling apparatus 100 clears the CDA to zero if the job scheduling apparatus 100 receives a message indicating completion of a job performed by the parallel computer connected to the job scheduling apparatus 100 or when a job submission is performed by the PC connected to the job scheduling apparatus 100 (Step S101). Then, the job scheduling apparatus 100 adds coverages of submeshes for jobs on the event list to the CDA (Step S102). The term "adding coverage to the CDA", as used here, means that the degree of overlap of submeshes with each other, i.e., the degree of interference between jobs, is represented as a depth value. For example, if two submeshes are overlapped each other at this time, a value "2" is set, whereas if one submesh is arranged, a value "1" is set.

Subsequently, the job scheduling apparatus 100 resets the RP so as to point to the top of the event list (Step S103). Thereafter, the job scheduling apparatus 100 resets the FP so as to point to a first submesh acquisition event in the event list (Step S104).

Then, the job scheduling apparatus 100 determines whether the FP reaches the end of the event list (Step S105). If the FP does not reach the end of the event list ("NO" at Step S105), the job scheduling apparatus 100 determines whether an event time difference between the FP and the RP is equal to or greater than the allocation period for the queued job (Step S106).

If the event time difference between the FP and the RP is less than the allocation period for the queued job ("NO" at Step S106), the job scheduling apparatus 100 adds coverages of submeshes where the FP is located to the CDA as a process of a submesh acquisition event for the submeshes where the FP is located (Step S107). The term "adding coverage to the CDA", as used here, means that a value "1" is added to each value of the coverage of the submesh pointed by the FP at this time.

Thereafter, the job scheduling apparatus 100 moves the position of the FP to the next submesh acquisition event (Step S108) and performs the process of Step S105. Furthermore, if the FP reaches the end of the event list ("YES" at Step S105), or if the event time difference between the FP and the RP is equal to or greater than the allocation period for the queued job ("YES" at Step S106), the job scheduling apparatus 100 determines whether a zero value element is present on the CDA (Step S109).

Then, if the zero value element is not present on the CDA ("NO" at Step S109), the job scheduling apparatus 100 moves the position of the RP to the next submesh release event (Step S110). Subsequently, as a process of the submesh release event for the submeshes where the RP is located, the job scheduling apparatus 100 subtracts coverages of submeshes where the RP is located from the CDA, (Step S111). The term "subtracting a coverage from the CDA, as used here, means that a value "1" is subtracted from each value of the coverage of the submesh pointed by the RP at this time.

Then, the job scheduling apparatus 100 determines whether the time difference between the FP and the RP is equal to or greater than the allocation period for the queued job (Step S112). If the time difference between the FP and the RP is less than the allocation period for the queued job ("NO" at Step S112), the job scheduling apparatus 100 performs the process of Step S105. If the time difference between the FP and the RP is equal to or greater than the allocation period for the queued job ("YES" at Step S112), the job scheduling apparatus 100 performs the process of Step S109.

If a zero value element is present on the CDA at Step S109 ("YES" at Step S109), the job scheduling apparatus 100 ends the process. The job scheduling apparatus 100 repeatedly performs the above process the same number of times as there are queued jobs.

Figure 11:
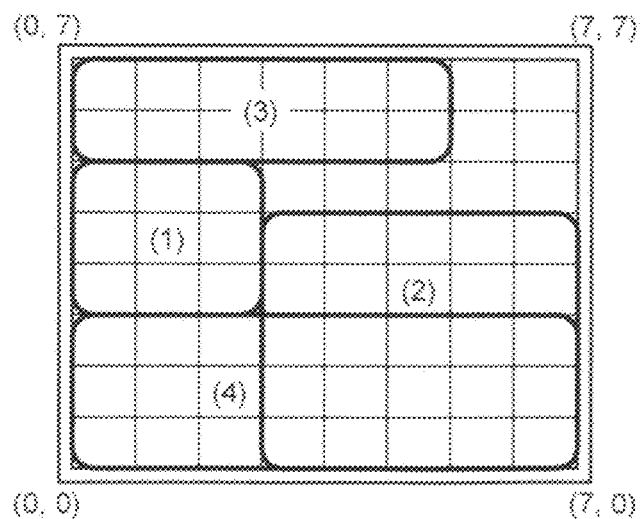
FIG. 11 is a schematic diagram illustrating an example of a CDA processed in accordance with the queued job allocation process.
Figure 12:
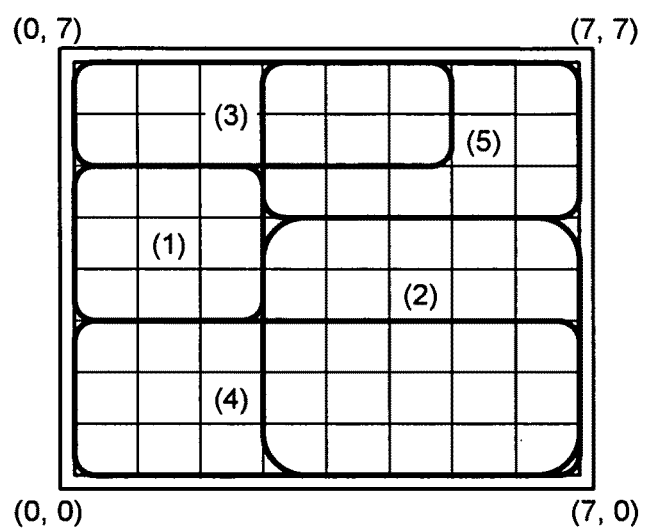
FIG. 12 is a schematic diagram illustrating an example of a CDA processed in accordance with the queued job allocation process.
Figure 13:
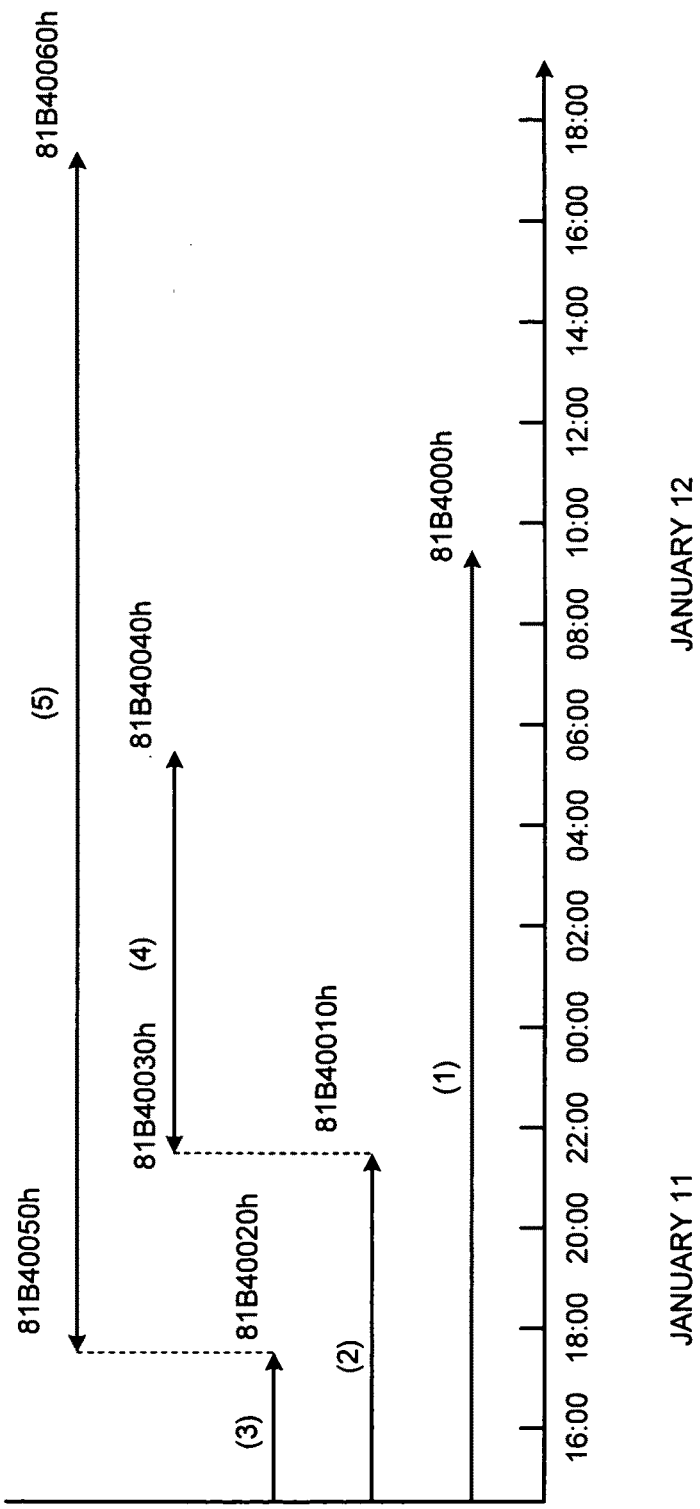
FIG. 13 is a schematic diagram illustrating an example of a timing chart of a job allocation period.

In the following, a specific example of allocating a queued job performed in accordance with the flow illustrated in FIG. 7 will be described with reference to FIGS. 8 to 16. FIGS. 8 to 12 are schematic diagrams illustrating examples of the CDA processed in accordance with a queued job allocation process. FIG. 13 is a schematic diagram illustrating an example of a timing chart of allocation periods for jobs. FIGS. 14 to 16 are tables illustrating examples of an event list processed in accordance with the queued job allocation process.

Figure 8:
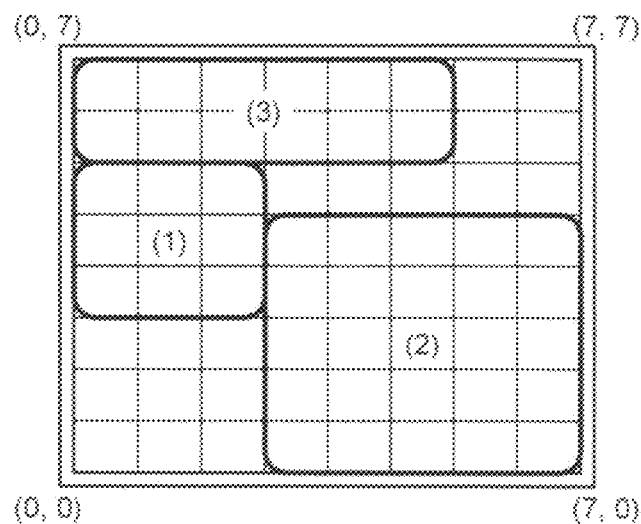
FIG. 8 is a schematic diagram illustrating an example of a CDA processed in accordance with the queued job allocation process.

Using the active-job list illustrated in FIG. 4 and the queued job list illustrated in FIG. 5, an example of arranging a queued job on the CDA will be described while creating an event list. The submeshes of active jobs are those illustrated in FIG. 8 in accordance with the active-job list. In FIG. 8, numbers (1) to (3) are assigned to each of the corresponding meshes.

For example, the job scheduling apparatus 100 creates an event list in accordance with the active-job list (see FIG. 14). The event list illustrated in FIG. 14 is in chronological order. Only the "release" events are registered in the type because all jobs are executed. In FIG. 14, numbers (1) to (3) corresponding to the meshes respectively in the CDA (see FIG. 8) are each assigned to one of the corresponding events.

Subsequently, the job scheduling apparatus 100 clears the CDA to zero. Then, when the job scheduling apparatus 100 allocates a queued job of size (8, 3) on the queued job list, as illustrated in FIG. 9, the job scheduling apparatus 100 extends the submeshes of the active jobs into (7, 2) in the direction of the origin and adds the coverages obtained at this time to the CDA.

Thereafter, the job scheduling apparatus 100 resets the RP to the top of the event list and sets the RP to "81B40020h". Furthermore, the job scheduling apparatus 100 resets the FP to the original submesh acquisition event and sets the FP to "00000000h". At this time, because only the active jobs are on the event list, no submesh acquisition events are on the event list. Accordingly, when the submesh acquisition event is reset using the FP, the FP is arranged at a position of "00000000h" representing an unallocated address on the event list.

Figure 9:
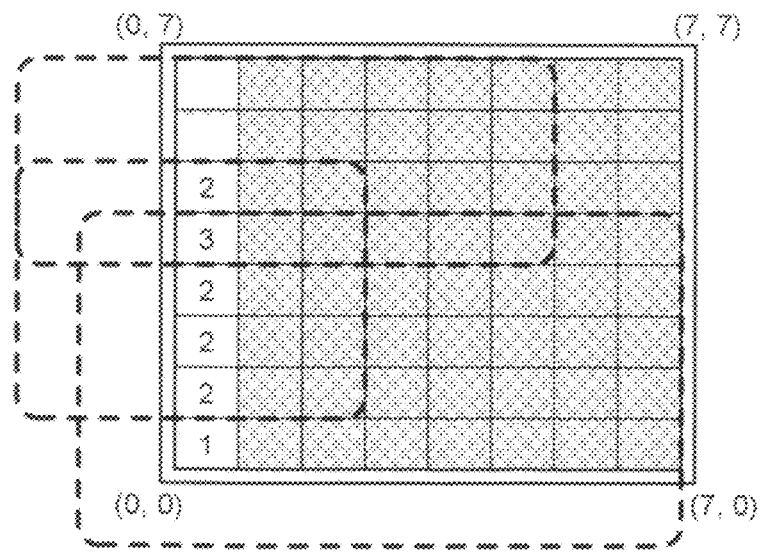
FIG. 9 is a schematic diagram illustrating an example of a CDA processed in accordance with the queued job allocation process.

After the address of FP="00000000h" is arranged on the end of the event list, the job scheduling apparatus 100 determines whether a zero value element is present on the CDA (see FIG. 9). Because the zero value element is not present on the CDA in this case, the job scheduling apparatus 100 moves the RP to the next submesh acquisition event and sets the RP to "81B40010h".

Figure 10:
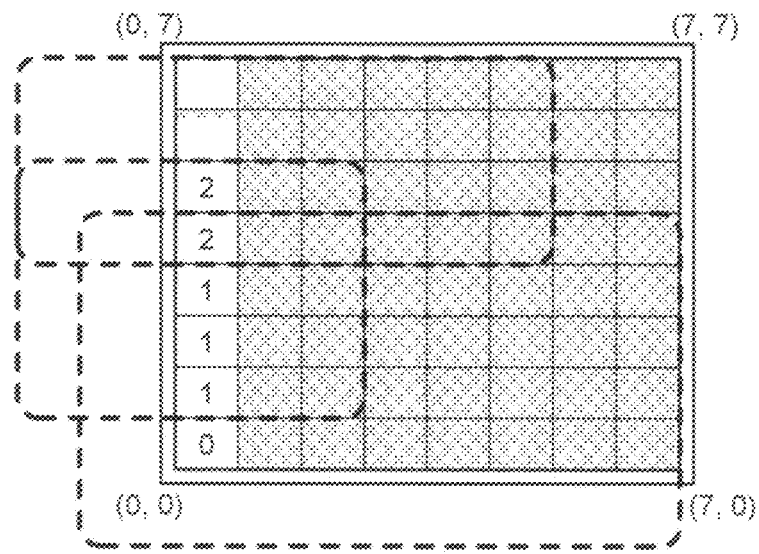
FIG. 10 is a schematic diagram illustrating an example of a CDA processed in accordance with the queued job allocation process.

The job scheduling apparatus 100 subtracts the coverage of the submesh "(2)" corresponding to the RP from the CDA as a process of the submesh release event for the submesh where the RP is arranged on "81B40010h" (see FIG. 10). The job scheduling apparatus 100 determines whether a zero value element is present on the CDA (see FIG. 10) because the time difference "12 hours 43 minutes" between the FP and the RP is more than the allocation period of "four hours" for the queued job.

Then, the job scheduling apparatus 100 ends the process because a zero value element is present at coordinates (0, 0) on the CDA. As illustrated in FIG. 11, if the queued job allocated in this way is assumed to be (4), the queued job corresponds to, the submesh (4) of size (8, 3) with the coordinates (0, 0) being set to the origin. Furthermore, as illustrated in FIG. 15, when the queued job (4) is added to the event list, the allocation event (4) and the release event (4) are inserted between the release events (2) and (1).

The job scheduling apparatus 100 also arranges a queued job of size (5, 3), which is listed on the queued job list, on the CDA by performing the same process described above. As illustrated in FIG. 12, if a queued job of size (5, 3) is assumed to be (5), the queued job corresponds to the submesh with the coordinates (3, 5) being set to the origin. As illustrated in FIG. 16, when the queued job (5) is added to the event list, the allocation event (5) is inserted between the release events (3) and (2), and the release event (5) is inserted after the release event (1).

As described above, according to the timing chart indicating the allocation period for events (1) to (5) illustrated in FIG. 13, the allocation event (5) starts upon the completion of the release event (3), and the allocation event (4) starts upon the completion of the release event (2). For the queued job (4), the allocation event and the release event are performed between the release event (2) and the release event (1). The release event (5) is performed after the release event (1).

Advantage of the First Embodiment

As described above, the job scheduling apparatus 100 arranges submeshes by overlapping them using the CDA that indicates the degree of interference between jobs to be allocated; therefore, it is possible for the job scheduling apparatus 100 to allocate queued jobs with a small amount of computational effort, thus improving the activity ratio of the system executing the jobs.

[b] Second Embodiment

The embodiment of the job scheduling apparatus disclosed in the present invention has been described; however, the present invention is not limited thereto and can be implemented with various kinds of embodiments. Therefore, as described below, another embodiment will be described in the following categories: (1) limiting the scanning region performed by the RP, (2) storing difference values in the CDA, (3) configuration of the job scheduling apparatus, and (4) programs.

(1) Limiting the Scanning Region Performed by the RP

In the first embodiment, a case is described in which scanning is performed, using the RP, until the submesh of the target job is reserved; however, the present invention is not limited thereto. For example, by limiting the scanning region using the RP, an active backfill can be implemented.

For example, at Step S110 in FIG. 7, when the RP deviates from a scanning region, the job scheduling apparatus 100 immediately stops searching for allocatable submeshes and does not reserve a submesh for the target job. Furthermore, as for scanning using the RP, at Step S110 in FIG. 7, the job scheduling apparatus 100 can stop searching for submeshes without allowing the RP to scan; the most active backfill is performed in this case.

(2) Storing Difference Values in the CDA

In the first embodiment, a case in which submesh allocation availability for a submesh, which has a computing node serving as an origin, is performed on the CDA has been described; however, the present invention is not limited thereto. For example, it is possible to speed up the update of the CDA by storing a difference value in an element in the corner of a coverage.

The CDA that stores therein difference values will be described with reference to FIG. 17. FIG. 17 is a schematic diagram illustrating an example of the CDA that stores therein difference values. In the following, a case in which a searching order that is used to search for a zero value element on the CDA is fixed will be described.

For example, three jobs are included in the coverages illustrated in the upper portion of FIG. 17. As illustrated in the middle portion of FIG. 17, when all elements for three job coverages are updated, a total of 14 additions need to be performed to update the CDA. As illustrated in the lower portion of FIG. 17, when the difference values are stored, a total of five updates, i.e., three additions and two subtractions, need to be performed to update the CDA. When the difference values are stored, values are calculated on the CDA in turn, and after the calculation, elements are searched for, including the result value of zero.

(3) Configuration of the Job Scheduling Apparatus

Furthermore, the processing procedures, the control procedures, the specific names, and the information containing various kinds of data or parameters described in the above specification or illustrated in the drawings (for example, data included in the "event list", etc.) can be arbitrarily changed unless otherwise noted.

The components of each devices illustrated in the drawings are only for conceptually illustrating the functions thereof and are not necessarily physically configured as illustrated in the drawings. In other words, the specific shape of a separate or integrated device is not limited to the drawings; however, all or part of the device can be configured by functionally or physically separating or integrating any of the units (e.g., the message transmission/reception unit 121 is separated into a message transmission unit and a message reception unit) depending on various loads or use conditions. Furthermore, all or any part of the processing functions performed by each unit can be implemented by a CPU serving as a computing processing unit and programs analyzed and executed by the CPU or implemented as hardware by wired logic.

(4) Programs

Figure 18:
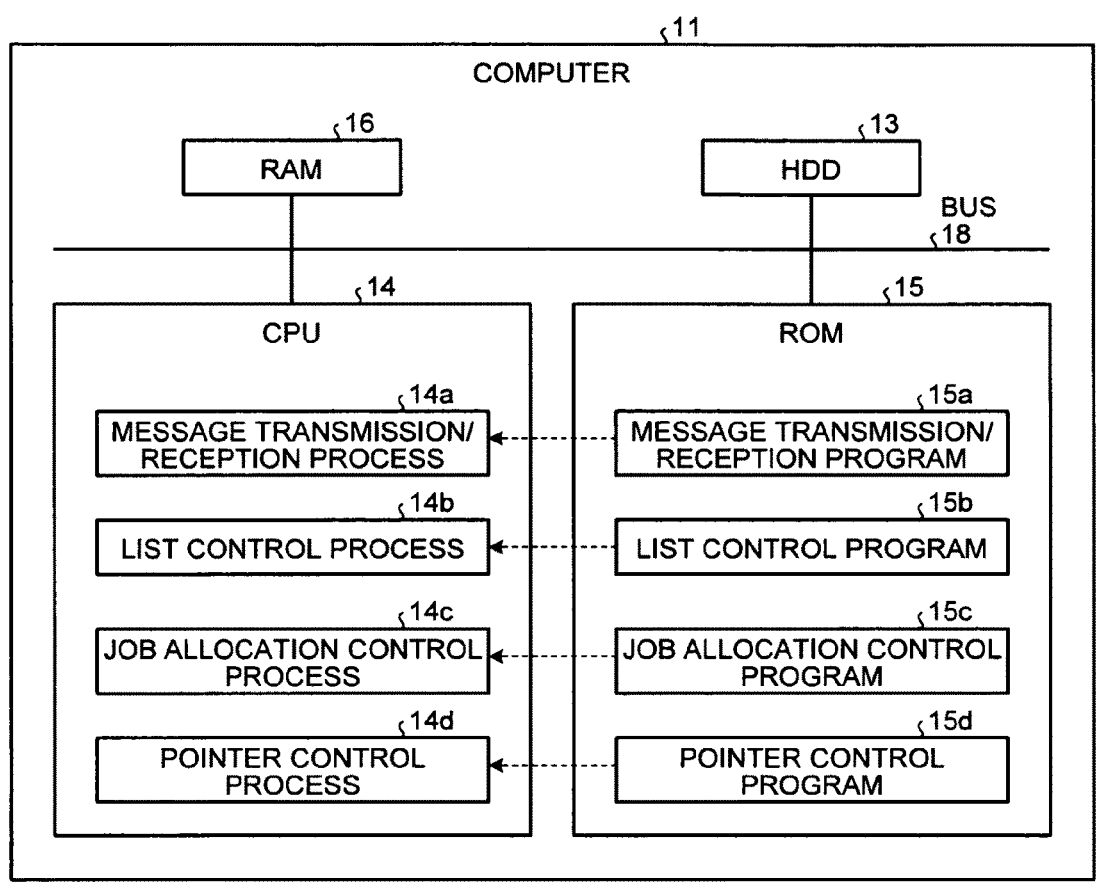
FIG. 18 is a block diagram illustrating a computer that executes a job scheduling program.

In the above-described embodiment, a case has been mentioned where various kinds of processes are implemented by a hardware logic; however, the present invention is not limited thereto. For example, various processes can be implemented by programs prepared in advance and executed by a computer. Accordingly, a computer that executes a job scheduling program having the same function as that is performed by the job scheduling apparatus 100 mentioned in the above-described embodiment will be described as an example with reference to FIG. 18. FIG. 18 is a block diagram illustrating a computer that executes the job scheduling program.

As illustrated in FIG. 18, a computer 11 serving as the job scheduling apparatus 100 includes a hard disk drive (HDD) 13, a central processing unit (CPU) 14, a read only memory (ROM) 15, a random access memory (RAM) 16, and the like, which are all connected via a bus 18.

The ROM 15 stores, in advance, the job scheduling program exhibiting the same function as the job scheduling apparatus 100 described in the first embodiment, i.e., as illustrated in FIG. 18, a message transmission/reception program 15a, a list control program 15b, a job allocation control program 15c, and a pointer control program 15d. These programs 15a to 15d can appropriately be integrated or separated in the same manner as the components of the job scheduling apparatus 100 illustrated in FIG. 3.

As illustrated in FIG. 18, because the CPU 14 reads and executes these programs 15a to 15d from the ROM 15, these programs 15a to 15d function as a message transmission/reception process 14a, a list control process 14b, a job allocation control process 14c, and a pointer control process 14d, respectively. Furthermore, the processes 14a to 14d correspond to, respectively, the message transmission/reception unit 121, the list control unit 122, the job allocation control unit 123, and the pointer control unit 124 illustrated in FIG. 3.

The CPU 14 executes the job scheduling program according to data (for example, the active-job list, the queued job list, the event list, the CDA, etc.) stored in the RAM 16.

The above-described programs 15a to 15d are not necessarily stored in the ROM 15 from the beginning. For example, they can be stored in a "portable physical medium" such as a flexible disk (FD), a compact disk read only memory (CD-ROM), a magneto-optic (MO) disk, a digital versatile disk (DVD), an IC card, and the like, which can be inserted into the computer 11; a "fixed physical medium" such as an HDD that can be arranged inside/outside the computer 11; and "another computer system" connected to the computer 11 via a public circuit, the Internet, a LAN, a WAN, and the like. The computer 11 then reads and executes the programs from the above.

According to an aspect of a job scheduling program, a job scheduling apparatus, and a job scheduling method disclosed in the present invention, it is possible to improve the activity ratio of a system that executes jobs.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A computer readable storage medium having stored therein a job scheduling program for allocating jobs to a plurality of information processing apparatuses, the job scheduling program causing a computer to execute a process comprising:

calculating depth values representing a degree of interference between jobs by using a two-dimensional array that stores therein jobs to be allocated to the plurality of information processing apparatuses in such a manner that the jobs are digitized and converted into array elements that correspond to the plurality of information processing apparatuses and the calculating being performed on a basis of numerical values that are stored in array elements to which jobs are allocated in the two-dimensional array;

searching the two-dimensional array for array elements that can be used for allocation corresponding to the jobs on a basis of the depth values calculated by the depth values calculating; and arranging the jobs by digitizing and converting the jobs into the array elements that can be used for the allocation, if there are array elements that can be used for allocation obtained by the searching.

2. The computer readable storage medium according to claim 1, wherein the process further comprising:

scanning an event list including information on allocation events and/or release events, using a first pointer that scans the allocation events for the jobs and a second pointer that scans the release events for the jobs to be allocated; and determining whether the jobs can be allocated within a period of time during which the first pointer and the second pointer scan the event list.

3. The computer readable storage medium according to claim 2, wherein the scanning includes ending scanning of the event list on a basis of the second pointer.

4. The computer readable storage medium according to claim 1, wherein the calculating includes calculating a difference value for an element in which the depth value varies from one end of an array.

5. A job scheduling apparatus for allocating jobs to a plurality of information processing apparatuses, comprising:

a memory that stores therein a two-dimensional array that stores therein the jobs to be allocated to the plurality of information processing apparatuses in such a manner that the jobs are digitized and converted into array elements that correspond to the plurality of information processing apparatuses; and a processor that is coupled to the memory to perform a process comprising calculating depth values representing a degree of interference between jobs on a basis of numerical values stored in array elements to which jobs are allocated in the two-dimensional array by using the two-dimensional array stored in the memory;

searching the two-dimensional array for array elements that can be used for allocation corresponding to the jobs on a basis of the depth values calculated by the depth value calculating; and arranging the job to be allocated by digitizing and converting into the array elements that can be used for the allocation, if there are array elements that can be used for allocation obtained by the searching.

6. A job scheduling method of allocating jobs to a plurality of information processing apparatuses, the job scheduling method comprising:

calculating, by a computer, depth values representing a degree of interference between jobs by using a two-dimensional array that stores therein jobs to be allocated to the plurality of information processing apparatuses in such a manner that the jobs are digitized and converted into array elements that correspond to the plurality of information processing apparatuses and the calculating being performed on a basis of numerical values that are stored in array elements to which jobs are allocated in the two-dimensional array;

searching, by the computer, the two-dimensional array for array elements that can be used for allocation corresponding to the jobs on a basis of the depth values calculated by the depth value calculating; and arranging, by the computer, the job to be allocated by digitizing and converting the job to be allocated into the array elements that can be used for the allocation, if there are array elements that can be used for allocation obtained by the searching.

* * * * *